United States Patent
Messager et al.

(10) Patent No.: US 7,234,643 B2
(45) Date of Patent: Jun. 26, 2007

(54) MICROELECTRONIC CIRCUIT FOR ACTIVATION OR DEACTIVATION OF AT LEAST ONE INPUT/OUTPUT, CORRESPONDING SMART CARD READER AND DEACTIVATION METHOD

(75) Inventors: Philippe Roland Messager, Nantes (FR); Sébastien Faivre, Nantes (FR)

(73) Assignee: Atmel Nantes S.A., Nantes (FR)

( * ) Notice: Subject to any disclaimer, the term of this patent is extended or adjusted under 35 U.S.C. 154(b) by 165 days.

(21) Appl. No.: 10/978,499

(22) Filed: Nov. 1, 2004

(65) Prior Publication Data

US 2005/0122807 A1 Jun. 9, 2005

(30) Foreign Application Priority Data

Oct. 31, 2003 (FR) .................................. 03 12838

(51) Int. Cl.
*G06K 19/06* (2006.01)
(52) U.S. Cl. ........................ 235/492; 235/382; 235/451
(58) Field of Classification Search ................. 235/492
See application file for complete search history.

(56) References Cited

U.S. PATENT DOCUMENTS 5,854,560 A 12/1998 Chow
5,862,390 A 1/1999 Ranjan
5,923,183 A 7/1999 Kim et al.
2004/0205095 A1* 10/2004 Gressel et al. .............. 708/253

OTHER PUBLICATIONS

Bodner et al. "Solid-State Power Sequencing System" *IBM Technical Disclosure Bulletin* vol. 17 No. 1, Jun. 1974, pp. 171-174.

* cited by examiner

*Primary Examiner*—Vibol Tan
(74) *Attorney, Agent, or Firm*—Merchant & Gould P.C.

(57) ABSTRACT

The invention concerns a microelectronic circuit for activation or respectively deactivating at least one second input/output (2, 3), or second "buffer", which receives a deactivation command (21, 31) corresponding to a combination of a general activation, or respectively deactivation, command (StopPadB) and of an information item representing the activated, or respectively deactivated, state (12, 22) of at least a first buffer, so that the said second buffer(s) is/are only activated, or respectively deactivated, when the said first buffer(s) is/are already activated, or respectively deactivated, to keep to a predetermined sequence of activation, or respectively deactivation, of the said buffers (1, 2, 3).

15 Claims, 1 Drawing Sheet

Figure 1:
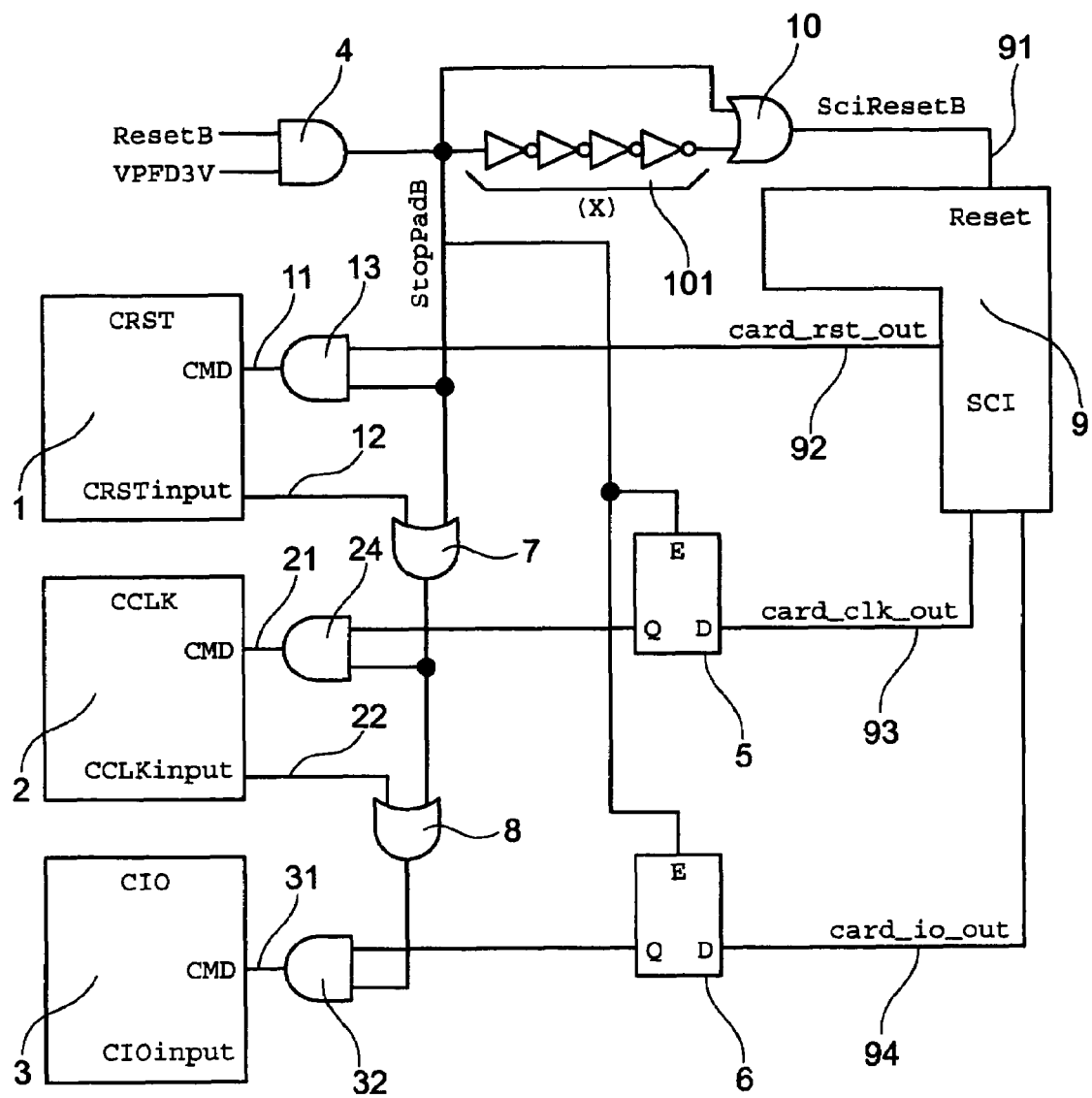

MICROELECTRONIC CIRCUIT FOR ACTIVATION OR DEACTIVATION OF AT LEAST ONE INPUT/OUTPUT, CORRESPONDING SMART CARD READER AND DEACTIVATION METHOD

BACKGROUND OF THE INVENTION

The field of the invention is that of microelectronic circuits. More precisely, the invention relates to the activation or deactivation of inputs/outputs, or of sets of inputs/outputs, (also termed hereinbelow "input/output buffers", when there are problems, and particularly when there is a power failure.

A specific field of application is to smart card readers, for which it is necessary to keep to a specific deactivation sequence when there is a power failure. However, the invention may be applied more generally to any circuit having to keep to a particular input/output activation and/or deactivation sequence, particularly when there is a power failure.

In the known systems, when a circuit undergoes a power failure, a power failure detector (PFD) enables emergency passing to a reset mode which prevents the microprocessor or a similar component, and internal memories, from performing erroneous operations.

For example, in the case of a conventional circuit having a typical supply VCC of 3V, and 2.7V minimum, the voltage Vreset for passing into reset mode is 2.4V, to protect the circuit (operating at x MHz) when the logic VCCmin is about 1.2V. The circuit then functions, but at a low frequency.

In certain applications, it is necessary to keep to a particular deactivation sequence when there is a power failure. This is the case for smart card readers. These have three communication inputs/outputs:
CCLK (clock of external smart card)
CRST (reset of this smart card)
CIO (enabling data transfer).

During a transaction between the smart card reader and a smart card, there is an exchange of information. During this transaction, and when there is a power fall-off, it is necessary to stop the communication. Thus a specification ISO7816 stipulates that CRST has first to be forced to 0, then CCLK and finally CIO.

When the power fall-off detector PFD places the microprocessor in reset, operations may no longer take place. According to the prior art, it is then this PFD reset command which places the three inputs/outputs of the card to 0 at the same time.

In fact, the microprocessor can no longer space these three communications over several clock cycles, since it is stopped and therefore no longer functional when the microprocessor is under reset.

Consequently no present circuit is effective, nor responds to the future ISO standard.

SUMMARY OF THE INVENTION

The invention has as its particular object to remedy these disadvantages of the prior art.

More particularly, an object of the invention is to provide a technique of deactivation of a series of buffers in a predetermined order or sequence, in the case of problems and particularly a power failure.

Therefore an object of the invention is to enable such a deactivation sequence to be realized, without the control of a microprocessor (which is in the reset state) and without the presence of a clock.

A particular object of the invention is to provide such a technique, particularly enabling the smart card reader to respond to present and future standards.

In the context of this application, another object of the invention is to provide such a technique, in particular enabling the smart card reader to safeguard current data.

Another object of the invention is to provide such a technique which is simple to use and inexpensive. In particular, an object of the invention is to provide such a technique, occupying a very small space on an integrated circuit.

Yet another object of the invention is to provide such a technique, capable of functioning even with a very low disposable voltage, and for example of the order of 1.2V.

These objects, as well as others which will become apparent in what follows, are attained by means of a microelectronic circuit for activation or deactivation of at least two buffers of at least one electronic component. According to the invention, at least one second buffer receives a deactivation command corresponding to a combination of a general activation, or respectively deactivation, command and an information item representing the activated, or respectively deactivated, state of at least a first buffer, so that the said second buffer(s) is/are only activated, or respectively deactivated, when the said first buffer(s) is/are activated, or respectively deactivated, to keep to a predetermined sequence of activation, or respectively deactivation, of the said buffers.

It is thereby to effectively and simply control an imposed sequence of activation or deactivation, even when in a situation of complete reset of the application.

The usual technical term "buffer" conventionally means input/output, or set of inputs/outputs.

The circuit advantageously uses only logic means not controlled by a clock.

It can therefore operate even if the application clock is interrupted.

According to a preferred embodiment of the invention, the said information item representing the activated, or respectively deactivated, state of a buffer is obtained on an input trigger of the latter.

In an advantageous application of the invention, the said general activation, or respectively deactivation, command is generated particularly in the case of a power failure of the said electronic component.

Preferably the said general activation, or respectively deactivation, command is transmitted to the said buffers with a predetermined delay.

The predetermined delay is preferably sufficient to permit at least one module of the said component to store at least one data being processed.

Advantageously, the said module delivers at least one information item confirming activation, or respectively deactivation, to be combined with the said general activation, or respectively deactivation, command to activate, or respectively deactivate, each of the said buffers.

The module preferably delivers a distinct information item confirming activation, or respectively deactivation, for each of the said buffers.

In a particular embodiment of the invention, at least one information item confirming activation, or respectively deactivation, is transmitted to each of the said buffers via a flip-flop D, storing and blocking the said information.

The said delay may in particular be generated using a series of inverters.

Advantageously, each of the said buffers receives a reset command via a AND gate which receives the said information item confirming deactivation on one of its two inputs, and on the other of its two inputs:

the said general activation, or respectively deactivation command for at least a first buffer;

the output of the one OR gate fed by the said general activation, or respectively deactivation command and at least one information item representing the activated, or respectively deactivated, state of at least one first buffer, for at least one second buffer, The said circuit may in particular be used in a smart card reader.

In this case, it advantageously controls the deactivation of the following buffer sequence:

deactivation of the reset buffer of a smart card (CRST)

deactivation of the clock buffer of a smart card (CCLK)

deactivation of the input/output buffer of a smart card (CIO)

The circuit advantageously comprises at least one delay line for controlling the delay between two activations, or respectively deactivations.

The invention also concerns smart card readers comprising a microelectronic circuit such as described above, as well as the corresponding process of activation or of deactivation.

According to this method, at least one second buffer receives a activation, or respectively deactivation, command corresponding to a combination of a general activation, or respectively deactivation, command and an information item representing the activated, or respectively deactivated, state of at least one first buffer, so that the second buffer(s) are only activated, or respectively deactivated, when the first buffer(s) are already activated, or respectively deactivated, to keep to a predetermined activation, or respectively deactivation, sequence of the said buffers.

Other characteristics or advantages of the invention will become more clearly apparent on reading the following description of a preferred embodiment, given by way of a non-limiting example, and of the single accompanying FIGURE showing an electronic circuit using the invention, in the case of a smart card reader.

The embodiment described below thus concerns smart card readers. More precisely, this embodiment concerns a smart card reader which conforms to the requirements of the specification ISO7816. The principle of the invention may of course be easily and simply adapted to other applications, and the number of buffers may be modified. The sequencing could if necessary also be adapted for two or more buffers to be simultaneously deactivated if necessary.

The same approach could of course also be used for a buffer activation sequence.

The principle of the invention rests in part on the observation that a buffer is bidirectional, and that its external level 0 or 1 of input/output can consequently be known, via the input "trigger".

This information can therefore be used to cascade the different deactivations.

DETAILED DESCRIPTION

Referring to the single FIGURE, it is thus desired to successively deactivate the input/outputs CRST 1. CCLK 2, then CIO 3.

The resetting of each of these inputs/outputs is effected by sending a corresponding reset command to the corresponding command input (CMD) 11, 21, or 31.

When an output/input goes into the reset mode, the corresponding information at the output can then be recovered on the associated input trigger (or level detector) CRSTinput 12 or CCLKinput 22.

If necessary, delay lines may be added on these leads 12 and 22, to control the time between two deactivations (the delay being chosen so as not to exceed the power fall-off time).

When the power fall-off detector PFD detects a power fall-off, it generates a corresponding signal VPSD3V with value 0, which is received by an AND gate 4. The other input of this AND gate is a ResetB signal (external reset), emitted by the application. This last information item enables the circuit of the invention to be used only when the microprocessor is under reset.

The AND gate 4 delivers a StopPadB signal.

This information StopPadB enables blocking the information coming from the microprocessor and transmitted to the buffers 2 and 3 so that these no longer permute, due to the flip-flops 5 and 6.

This information will simultaneously force the buffer CRST 1 to fall to zero. The inlets/outlets are charged by the parasitic capacities of the junctions on the integrated circuit; this communication occurs in about 20 microseconds.

When the buffer CRST is at zero, the information of the corresponding input trigger CRSTinput 12 will switch, and an information item will therefore be available indicating that CRST has switched, and it effectively at 0. This signal 12 enables commanding the fall of CCLK in its turn, via an OR gate 7 receiving at the input the items of information CRSTinput and StopPadB.

In the same way, the signal CCLKinput 22 then switches, when the buffer CCLK is equal to zero. This command CCLKinput then enables, via an OR gate 8, commanding to set the buffer CIO 3 to zero.

This principle of chaining, which is easily understood, enables keeping to the order of deactivation of buffers while the circuit is being reset.

It will be noted that it is functional down to a very low voltage, of the order of 1.2V, because it is purely logic (there are no frequency constraints). Therefore there is no need of a clock, and thus of oscillators.

The circuit supply VCC represents a capacity of several nanofarads, which broadly permits time to perform such chaining, between the detection level 2.4V and the level 1.2V at which nothing will function.

In the embodiment shown, with 10 nF of internal supply capacity, chaining may be performed between 2.4V and 2.1V.

According to a particular aspect of the invention, means have been provided to enable the smart card to store the necessary data which was being processed.

For this, the smart card interface (SCI) 9 is acted on. The reset signal StopPadB is transmitted to this module SCI 9, at its reset input 91, in a delayed form SciResetB.

This delay is for example ensured by an OR gate 10, having the signal StopPadB directly as one of its inputs, and the other input the signal StopPadB delayed by a set of inverters 101, the number X of which is chosen so as to enable the circuit to have time to store (latch) the necessary information before the reset of the module SCI 9.

This module SCI 9 generates three command outputs, respectively for each of the buffers:

card_rst_out 92;
card_clk_out 93;
card_io_out 94.

The last two are respectively transmitted to the input D of the flip-flops 5 and 6, the Q outputs of which respectively supply two AND gates 24 and 32, the other input of which corresponds to the outputs of the OR gates 7 and 8 respectively, and which deliver the commands 21 and 31.

The signal 92 is directly transmitted to an AND gate 13 which delivers the command 11 and has as its other input the signal StopPadB.

As already mentioned, the chaining principle of the invention may easily be adapted to other applications.

The invention claimed is:

1. Microelectronic circuit for activation or deactivation of at least first and second buffers of at least one electronic component, wherein at least one second buffer receives a deactivation command corresponding to a combination of a general activation or deactivation command and an information item representing an activated or deactivated state of at least one of the first buffers, so that at least one of the second buffer(s) is/are only activated or deactivated when the first buffer(s) is/are already activated or deactivated to keep to a predetermined sequence of activation or deactivation of the first and second buffers;
    wherein the information representing the activated or deactivated state of a buffer is obtained on an input trigger of the latter.

2. Microelectronic circuit according to claim 1, wherein the microelectronic circuit uses solely logic means not controlled by a clock.

3. Microelectronic circuit according to claim 1, wherein the activation or deactivation command is generated when there is a power failure of the electronic component.

4. Microelectronic circuit according to claim 1, wherein the general activation or deactivation command is transmitted to the buffers with a predetermined delay.

5. Microelectronic circuit according to claim 4, wherein the predetermined delay is sufficient to permit at least one module of the component to store at least one data being processed.

6. Microelectronic circuit according to claim 5, wherein the module delivers at least one information item of confirmation of activation or deactivation which is to be combined with the general activation or deactivation command to activate or deactivate each of the buffers.

7. Microelectronic circuit according to claim 6, wherein the module delivers a distinct information item of confirmation of activation or deactivation for each of the buffers.

8. Microelectronic circuit according to claim 7, wherein at least one information item of confirmation of activation or deactivation is transmitted to one of the buffers via a flip-flop storing and blocking the information item.

9. Microelectronic circuit according to claim 4, wherein the delay is generated by means of a series of inverters.

10. Microelectronic circuit according to claim 6, wherein each of the buffers receives a reset command via an AND gate receiving on one of its two inputs the information item confirming deactivation and on the other of its two inputs:
    the activation, or respectively deactivation, command for at least a first buffer;
    the output of an OR gate supplied by the general activation, or respectively deactivation, command and at least one information item representing the activated, or respectively deactivated, state of at least one first buffer, for at least one second buffer.

11. Microelectronic circuit according to claim 1, wherein the microelectronic circuit comprises at least one delay line for controlling the delay between two activations or deactivations.

12. Microelectronic circuit according to claim 1, wherein the microelectronic circuit is used in a smart card reader.

13. Microelectronic circuit according to claim 12, wherein the microelectronic circuit controls the deactivation of the following buffer sequence:
    deactivation of the reset buffer of a smart card;
    deactivation of the clock buffer of a smart card;
    deactivation of the input/output buffer of a smart card.

14. Smart card reader comprising a circuit, wherein the circuit comprises a microelectronic circuit according to any one of claims 1-13.

15. Method of activation or deactivation of at least first and second buffers of at least one electronic component, comprising:
    receiving at the at least one second buffer an activation or deactivation command corresponding to a combination of a general activation or deactivation command and of an information item representing the active or inactive state of the at least one first buffer so that the second buffer(s) is/are only activated or deactivated when the first buffer(s) is/are already activated, to keep to a predetermined sequence of activation or deactivation of the buffers;
    wherein the information representing the activated or deactivated state of a buffer is obtained on an input trigger of the latter.

* * * * *